Patented Jan. 5, 1932

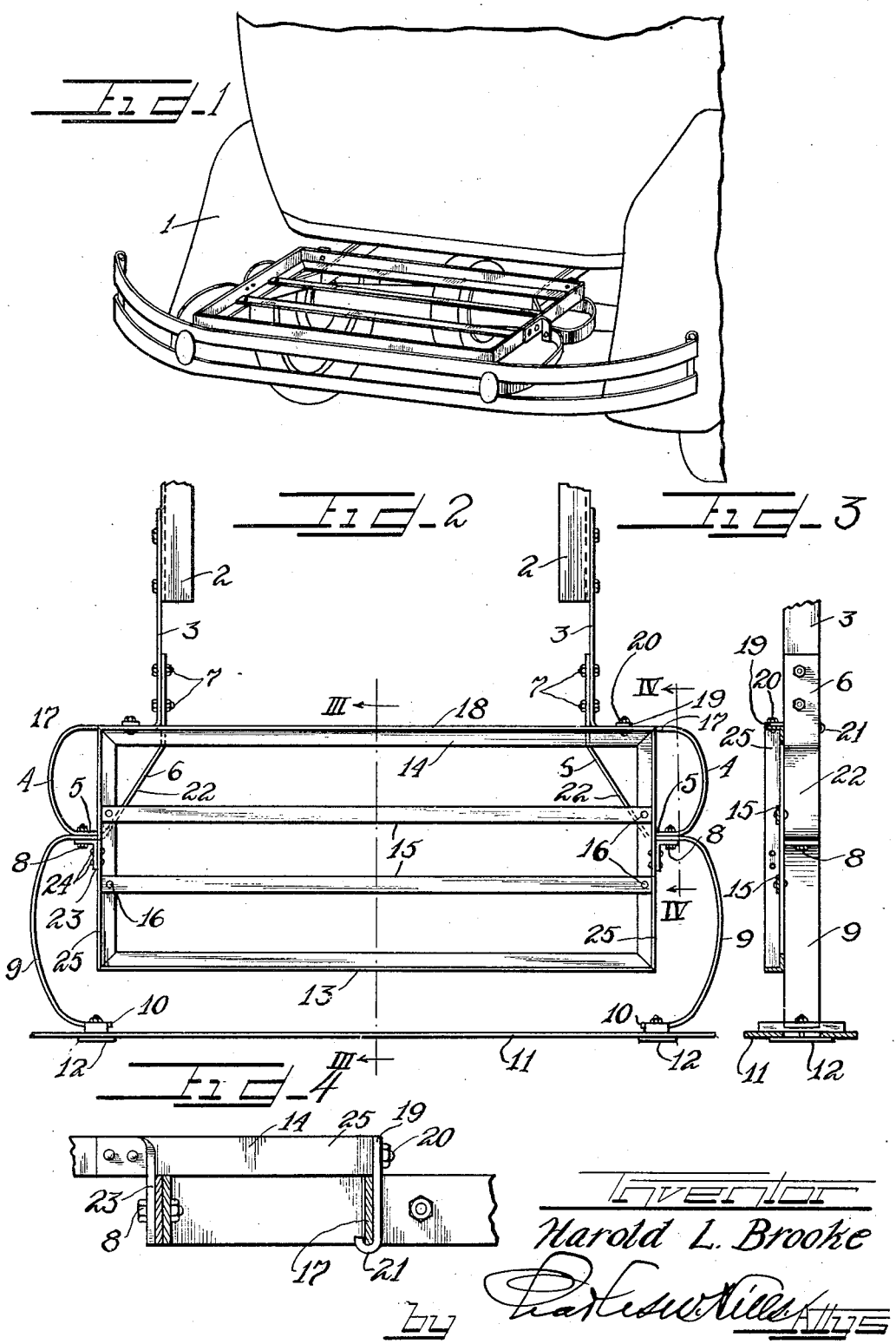

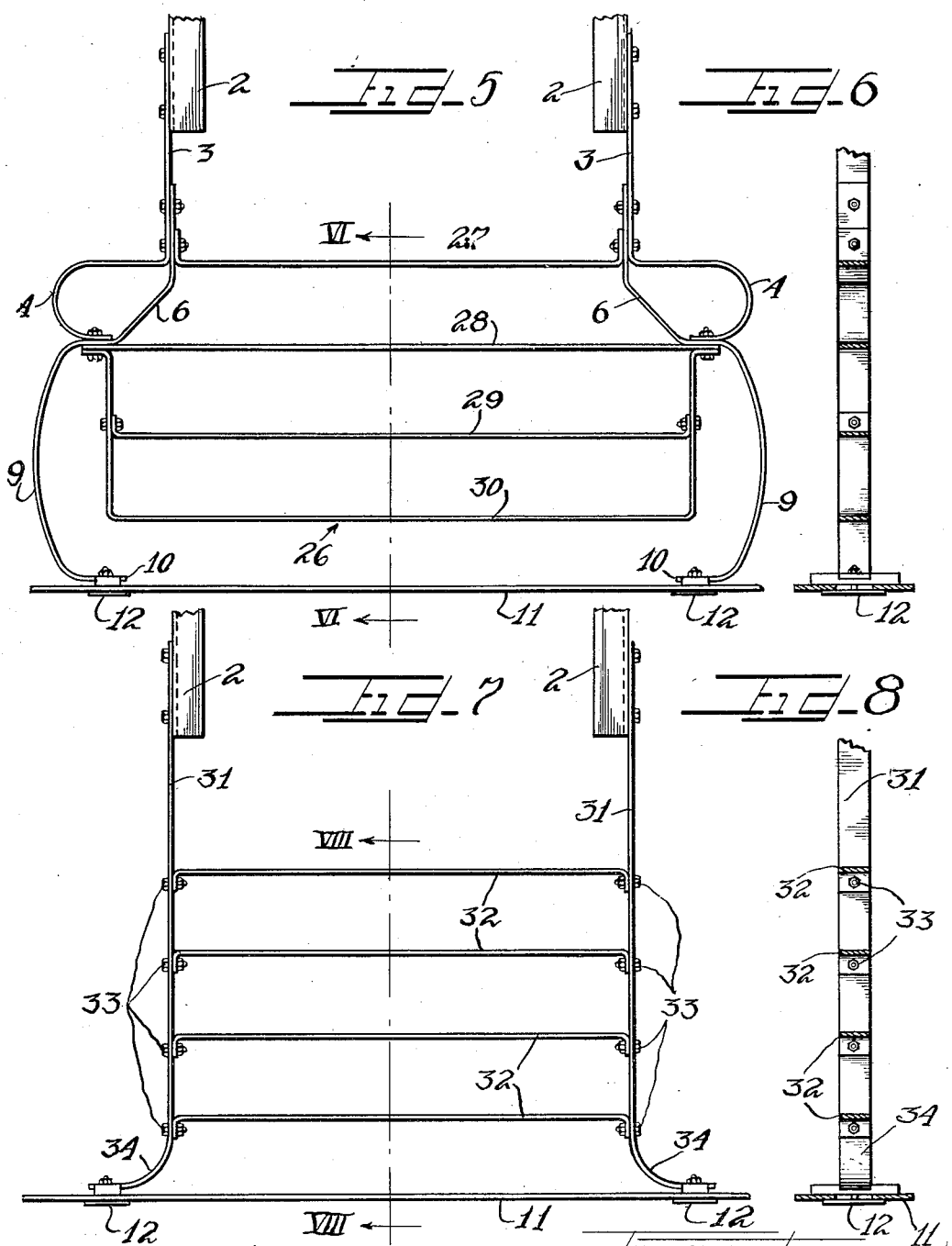

1,839,641

UNITED STATES PATENT OFFICE

HAROLD L. BROOKE, OF DETROIT, MICHIGAN, ASSIGNOR TO GENERAL SPRING BUMPER CORPORATION, OF DETROIT, MICHIGAN, A CORPORATION OF MICHIGAN

COMBINATION BUMPER EXTENSION AND TRUNK RACK

Application filed August 18, 1930. Serial No. 475,941.

This invention relates to trunk racks as applied to automobiles, particularly the rear part.

The principal object of this invention resides in the provision of a trunk rack in combination with the rear bumper construction of an automobile. A further object lies in providing a bumper supporting means which serves also to support a trunk rack.

A further object of my invention resides in a rack for a trunk, which rack serves also to reinforce the bumper supporting means.

Further objects will appear as the description proceeds.

Referring now to the drawings:

Figure 1 is a fragmentary perspective view of the rear construction of an automobile, illustrating one form of trunk rack construction embodying my invention;

Figure 2 is an enlarged plan view illustrating the construction shown in Figure 1;

Figure 3 is a fragmentary side elevation taken approximately in the plane indicated by the line III—III in Figure 2;

Figure 4 is an enlarged fragmentary side view taken approximately in the plane of the line IV—IV of Figure 2;

Figure 5 is a view similar to that of Figure 2, but showing another form of my invention;

Figure 6 is a fragmentary elevation taken approximately in the plane of the line indicated at VI—VI in Figure 5;

Figure 7 is a view similar to Figures 2 and 5 illustrating a still further form of my invention; and Figure 8 is a fragmentary elevational view taken in the plane indicated by the line VIII—VIII in the Figure 7.

The numeral 1 designates the rear portion of an automobile having rearwardly extending bars 2 on the chassis. As is now the practice, bumper hanger members 3 are securely bolted or otherwise fastened to the bars 2, the hangers 3 being bowed outwardly as indicated at 4. It is the present practice to secure the end 5 of each hanger 3 directly to the bumper, the bowed portion 4 of the hanger serving as spring cushioning means for the bumper. My improved construction contemplates the retention of the advantages of the construction just set forth, and at the same time the provision of a truck rack embodied with the bumper supporting means, the parts being so arranged that the trunk rack will not interfere with the cushioning instrumentalities for the bumper.

To the above and other ends, I provide in one form of my invention auxiliary bars or hangers 6 secured at 7 to the hangers 3. The hanger members or bars 6 are secured intermediate their ends to the ends 5 of the hangers 3 by bolts or other suitable means 8, and are provided with bowed portions 9 whose extremities 10 are secured to the bumper 11 by means of bumper clamps 12. The rack 13 may be suitably constructed. One form is illustrated in Figure 2 and comprises a substantially rectangular frame member 14 of angle construction, having one flange extending upwardly from the other, said upwardly extending flange serving to maintain the trunk (not shown) against lateral displacement. Bars or slats 15 are secured to the horizontal flanges of the rack 13 by any suitable means 16, the number of slats employed being, of course, variable to suit the desire or need. The bowed portion 4 of each hanger 3 is spaced from the main body of the hanger by an offset 17 which is substantially flush with the vertical flange 18 of the rack 13. A hook member 19 is secured adjacent each end of the flange 18 by a bolt 20 or other suitable means, the hook 21 receiving the offset 17 as clearly shown in Figure 4. The rack 13 is further supported by an intermediate portion 22 of each auxiliary hanger 6. As a further means of support for the rack 13, a gusset member 23 provided with flanges at right angles to each other is riveted or otherwise suitably secured at 24 to each of the side flanges 25 of the rack 13, and to the hangers 3 and 6 by means of the bolt 8 aforementioned. The bowed portions 9 are made sufficiently long so that the rear portion of the rack 13 will not interfere with the cushioning action of said bowed portions.

It will be seen from the above that the rack 13 will properly support a trunk without interfering with the cushioning action of the bumper 11, the auxiliary hanger 6 serving also as a support for the rack. This construction, moreover, provides a very neat appearance and involves simple parts which are easy to manufacture. Another advantage of this construction lies in the fact that the bumper serves as a protecting means for the rack.

The form of my invention illustrated in Figures 5 and 6 is very similar to that just described, the only difference lying in the rack construction per se. In this embodiment of my invention all of the parts constituting the rack lie in substantially the same plane with the bumper supporting hangers. The rack, which is indicated generally at 26 embodies a plurality of bars 27, 28, 29 and 30 secured to one another and to the hanger members 3 and 6. The bars are substantially, though not necessarily, parallel and, with the hangers 3 and 6, form a substantially closed rectangle which will provide a proper support for a trunk. It will be noted in this construction, as in the construction of Figures 1 to 4 inclusive, that the rearmost portion of the rack 26 is spaced a substantial distance from the bumper 11 so that the bump acts as a safeguard for the rack and trunk supported thereby as well as for the vehicle. This construction permits of the support of trunks of various sizes, and if the need should arise, can be provided with suitable guide members corresponding to the upwardly extending flanges of the rack 13, to position the trunk on the rack.

It will be apparent that the parts may be put together with a minimum of time and effort and that the cost of manufacture is very low by reason of the fact that the bars constituting the hangers and the rack may be constructed of the same size of strip or bar.

A third embodiment of my invention, providing a somewhat simpler construction than those heretofore mentioned, lies in the provision of bumper hangers 31, the greater portions of which extend straight to the rear of the vehicle. The hangers 31 are reinforced by connecting members 32 substantially identical with each other and secured to the hangers 31 by any suitable means, such as bolts 33. In addition to reinforcing the hangers 31, the bars 32 constitute with said hangers 31 a trunk rack adapted to support trunks of various sizes. The rearmost portions 34 of the hangers 31 are turned outwardly to provide a cushion for the bumper 11, to which said portions 34 are secured by bumper clamps 12. This form of my invention is on the whole marked by extreme simplicity, all parts of the hangers and the rack being disposed in substantially the same plane and being constructed of the same strip material.

The hanger members employed in the various constructions described herein are of suitable spring material in order to provide the proper cushioning for the bumper.

Now I desire it understood that many changes may be made and numerous details of construction may be varied through a wide range without departing from the principles of this invention and I, therefore, do not purpose limiting the patent granted hereon otherwise than necessitated by the prior art.

I claim as my invention:

1. In a device of the class described, a bumper hanger, an auxiliary hanger secured to the first hanger and extending rearwardly thereof, said auxiliary hanger having means for securement to a bumper and providing a cushion therefor, and a trunk rack supported by and reinforcing said hangers, said means being disposed rearwardly of the rearmost portion of said rack, whereby said cushioning means will protect said rack and a trunk supported thereby.

2. In a device of the class described, bumper hangers, and trunk supporting means reinforcing said hangers and out of normal contact range of a bumper supported by said hangers.

3. In a device of the class described, spaced hangers, trunk supporting means intermediate and connecting said hangers, said hangers having extensions disposed outwardly beyond said means, said extensions being adapted for receiving a bumper, whereby said trunk supporting means is spaced from and protected by a bumper to be supported by said hangers.

4. In a device of the class described, spaced bumper hangers, and means for reinforcing said hangers in spaced relation, said means including a plurality of bars defining a rack for receiving a trunk, a portion of each hanger supporting said rack and a second portion of each hanger comprising a cushioning element extending beyond said rack, and a bumper connected to said elements.

5. In a device of the class described, spaced bumper hangers having cushioning portions for receiving a bumper, rigid means supported by and connecting said hangers for reinforcing and maintaining the same in spaced relation, said means comprising a rack including a frame having upstanding guides to position a trunk to be supported by said rack.

6. In a device of the class described, bumper hangers, each including a cushioning portion, trunk supporting means connecting and reinforcing said hangers adjacent one end of each cushioning portion, and a bumper connected to the other ends of said portions.

7. In a device of the class described, bumper hangers, cushioning portions for a bumper to be supported by said hangers, and a plurality of bars connecting and reinforcing said hangers adjacent one end of each bowed portion, said bars and hangers constituting a support for a trunk or the like, the other ends of said portions being free for connection to a bumper.

8. In a device of the class described, bumper hangers, bowed portions for cushioning a bumper and forming parts of said hangers, and a plurality of bars connecting and reinforcing said hangers adjacent one end of each bowed portion, said bars and hangers constituting a support for a trunk or the like, the other ends of said bowed portions being free and adapted to receive a bumper, said hangers and bars being disposed in substantially the same plane, whereby to provide a support area capable of accommodating trunks of various sizes.

9. In a device of the class described, bumper hangers, said hangers having bowed portions for cushioning a bumper to be supported thereby, and a plurality of bars connecting and reinforcing said hangers adjacent one end of each bowed portion, said bars and hangers constituting a support for a trunk or the like, the other ends of said bowed portions being free and adapted to receive a bumper, said free ends being disposed rearwardly of said bars, whereby the bumper to be supported by said hangers will protect the trunk to be carried.

10. In a device of the class described, bumper hangers having bowed portions for cushioning a bumper to be supported by said hangers, and a plurality of bars connecting and reinforcing said hangers adjacent one end of each bowed portion, said bars and hangers constituting a support for a trunk or the like, the other ends of said bowed portions being free and adapted to receive a bumper, said bowed portions straddling and extending outwardly beyond said bars to protect the trunk at the side as well as at the rear.

11. In a device of the class described, bumper hangers adapted for attachment to the chassis of an automobile and extending in substantial parallelism, a plurality of transverse bars connecting and reinforcing said hangers, said hangers extending beyond the bars and providing bumper cushioning means adapted to receive a bumper.

In testimony whereof I have hereunto subscribed my name at Detroit, Wayne County, Michigan.

HAROLD L. BROOKE.